United States Patent
Wurth (10) Patent No.: US 8,134,244 B2
(45) Date of Patent: Mar. 13, 2012

(54) HYBRID START/RUN APPARATUS

(76) Inventor: James Wurth, Las Vegas, NV (US)

( * ) Notice: Subject to any disclaimer, the term of this patent is extended or adjusted under 35 U.S.C. 154(b) by 353 days.

(21) Appl. No.: 12/466,864

(22) Filed: May 15, 2009

(65) Prior Publication Data

US 2009/0283343 A1    Nov. 19, 2009

Related U.S. Application Data

(60) Provisional application No. 61/053,973, filed on May 16, 2008.

(51) Int. Cl.
*B60K 25/00* (2006.01)
(52) U.S. Cl. .......................... 290/1 A; 290/1 R
(58) Field of Classification Search ................. 290/1 A, 290/1 R, 10; 123/2; 307/68; 180/53.5, 65.21
See application file for complete search history.

(56) References Cited

U.S. PATENT DOCUMENTS

| | | | |
|---|---|---|---|
| 6,424,891 B1 * | 7/2002 | Sargent et al. ............... 701/29 |
| 6,894,625 B1 * | 5/2005 | Kozma et al. ................ 340/950 |
| 7,119,450 B2 * | 10/2006 | Albrecht ........................ 290/1 A |
| 7,461,516 B2 * | 12/2008 | Leadingham et al. .......... 62/236 |
| 7,642,665 B2 * | 1/2010 | Konop et al. ................. 290/1 A |
| 2004/0011918 A1 * | 1/2004 | Musial et al. ................. 244/1 R |
| 2004/0263099 A1 * | 12/2004 | Maslov et al. ................ 318/254 |
| 2006/0090437 A1 * | 5/2006 | Hunt et al. .................... 56/10.6 |
| 2006/0157987 A1 * | 7/2006 | Albrecht ........................ 290/1 A |
| 2007/0125056 A1 * | 6/2007 | Edmond ........................ 56/11.9 |
| 2007/0144799 A1 * | 6/2007 | Vasant .......................... 180/65.1 |

* cited by examiner

*Primary Examiner* — Quyen Leung
*Assistant Examiner* — Naishadh Desai
(74) *Attorney, Agent, or Firm* — Parsons & Goltry; Robert A. Parsons; Michael W. Goltry

(57) ABSTRACT

Hybrid start/run apparatus for engines includes a transport assembly and a hybrid start/run assembly. The transport assembly includes a multi-wheeled truck with at least a front wheel and two rear wheels, a drive motor attached to the rear wheels, transport control apparatus connected to the drive motor and including forward, reverse, and speed controls, and steering apparatus coupled to the at least one front wheel. The hybrid start/run assembly includes an engine, a mating generator couple to be driven by the engine and a plurality of batteries mounted on the transport assembly, and cables adapted to be coupled to a remotely located engine. The control apparatus couples the generator and the plurality of batteries to the cables in at least a start/run position.

13 Claims, 7 Drawing Sheets

HYBRID START/RUN APPARATUS

CROSS-REFERENCE TO RELATED APPLICATIONS

This application claims the benefit of U.S. Provisional Application No. 61/053,973, filed 16 May 2008.

FIELD OF THE INVENTION

This invention generally relates to a start/run apparatus for aircraft engines and the like requiring external starting equipment and run power for a limited time.

BACKGROUND OF THE INVENTION

In many instances, batteries are used in motor starting operations, such as for starting engines in small aircraft and the like. Generally, the battery is used to boost the operating internal battery in the aircraft and to reduce stress on the internal battery.

To perform the starting operation, the booster battery must be carried to the aircraft and connected into the electrical system. In many, if not most, operations, the aircraft will stand for a time on the runway after the engine or engines are started while various operations are performed, e.g. warm-up, etc. It is generally desirable to supply 'run' electrical power to the airplane during this period. However, the booster battery generally cannot provide continuous power to the aircraft after starting the engine. Further, once the aircraft is started the booster battery must be carried back to a storage area and, generally, periodically recharged. After a number of uses, the battery does not recharge properly and the entire assembly is discarded and a new assembly is brought on line.

In some applications electrical generators are used in place of batteries. One problem with these generators is their size. They are usually mounted on carts or trucks that must be wheeled to the site and then wheeled back to storage until they are again needed. To provide the required starting power the generators and the driving engines must be very large and are very expensive and difficult to operate. For example, an engine running a generator must be of sufficient size (e.g. 100 horse power) to generate enough amperes to start an aircraft engine.

It would be highly advantageous, therefore, to remedy the foregoing and other deficiencies inherent in the prior art.

Accordingly, it is an object of the present invention to provide a new and improved hybrid start/run and transport assembly.

It is another object of the present invention to provide a new and improved hybrid start/run and transport assembly that is relatively small, inexpensive, and easy to transport and operate.

It is another object of the present invention to provide a new and improved hybrid start/run and transport assembly that can be connected to the electrical system of an aircraft and used to start the aircraft as well as to provide continuous run power after starting.

SUMMARY OF THE INVENTION

Briefly, to achieve the desired objects of the instant invention in accordance with a preferred embodiment thereof, provided is hybrid start/run apparatus for remotely located engines. The hybrid start/run apparatus includes a transport assembly including a multi-wheeled truck with at least a front wheel and two rear wheels, a drive motor attached to the rear wheels, transport control apparatus connected to the drive motor and including forward, reverse and, speed controls, and steering apparatus coupled to the at least one front wheel. Hybrid start/run apparatus includes an engine, a mating generator coupled to be driven by the engine and a plurality of batteries mounted on the transport assembly. The batteries and generator are coupled in parallel to cables adapted to be coupled to a remotely located engine. The batteries are capable of supplying starting electrical power to the remotely located engine and the generator is capable of supplying run electrical power.

The desired objects of the instant invention are further realized in accordance with a more specific embodiment of hybrid start/run apparatus for remotely located engines. In this specific embodiment the remotely located engine is include in aircraft having an electrical system and the cables are adapted to be coupled to the electrical system. The batteries are capable of supplying starting electrical power, up to a peak power of 3400 amperes, to the aircraft engine through the electrical system and the generator is capable of supplying run electrical power, up to a peak power of 300 amperes, to the electrical system for limited periods of time, e.g. warm-up of the aircraft engine, etc.

BRIEF DESCRIPTION OF THE DRAWINGS

The foregoing and further and more specific objects and advantages of the instant invention will become readily apparent to those skilled in the art from the following detailed description of a preferred embodiment thereof taken in conjunction with the drawings, in which.

DETAILED DESCRIPTION OF A PREFERRED EMBODIMENT

Figure 1:
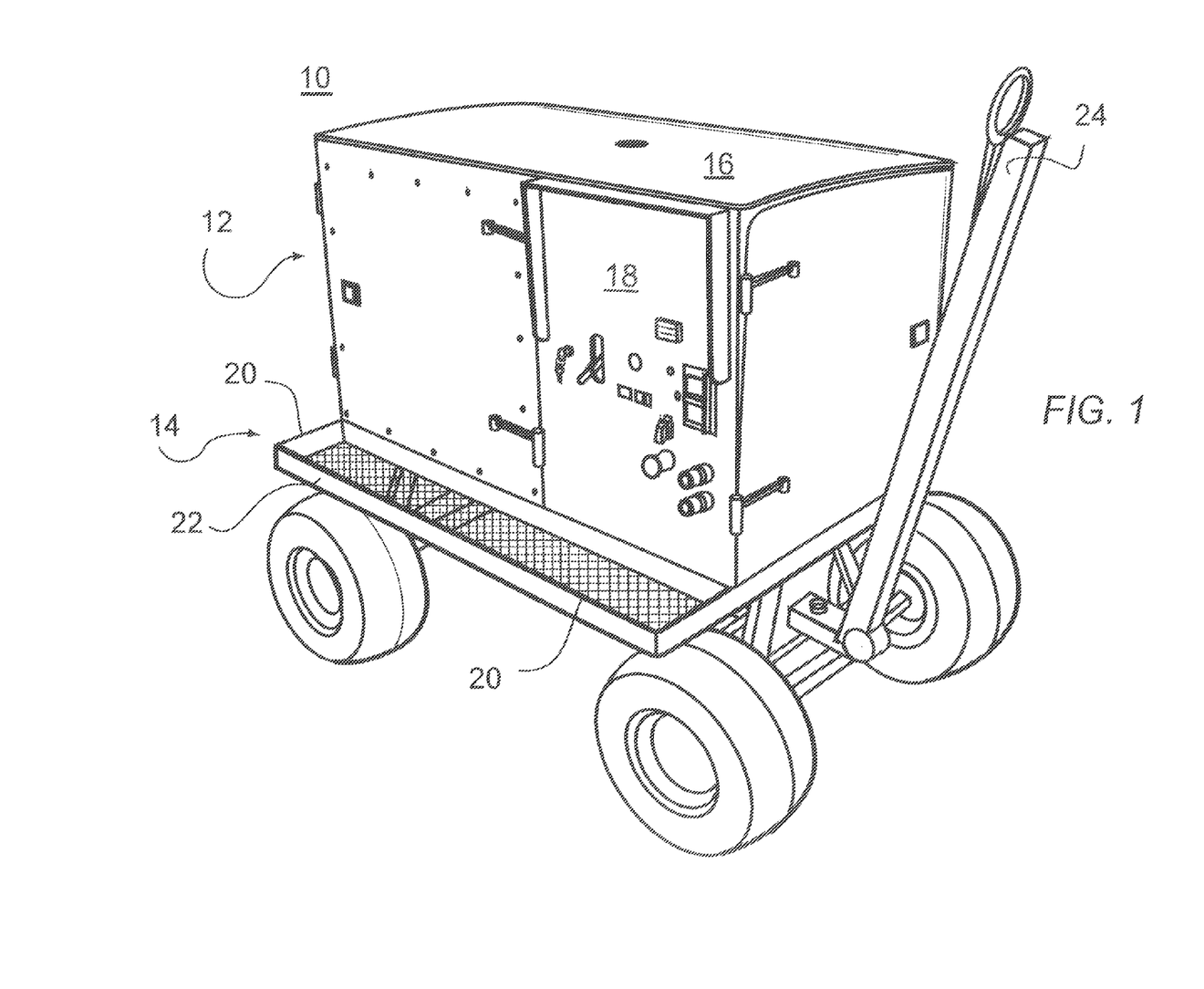
FIG. 1 is a view in perspective of a hybrid start/run and transport assembly, in accordance with the present invention.

Turning now to FIG. 1, hybrid start/run apparatus and transport assembly, generally designated 10, is illustrated. Assembly 10 includes hybrid start/run apparatus 12 carried on a transport assembly 14. Hybrid start/run apparatus 12 is contained in a housing or generally rectangularly shaped box 16 formed of metal (e.g. steel, aluminum. sheet metal, etc.), hard rugged plastic or the like. Start/run apparatus box 16 includes batteries, generator and driving motor or engine, all of which is described in more detail below. A control panel 18 on one side of box 16 is conveniently positioned for operating the hybrid start/run apparatus, as will be explained in more detail below. Transport assembly 14 includes a four wheeled truck 20 with a heavy duty frame and a screen type bed. Cables and/or connecting devices (not shown) are carried on a power cable tray 22 formed as part of the screen type bed. Hybrid start/run apparatus 12 has bottom venting from box 16 for removing excess heat and the like from the internal components, which can be vented through the screen type bed of truck 20 into the surrounding atmosphere.

Transport assembly 14 includes a four wheeled truck 20 with a tongue 24 attached to the front wheels. Tongue 24 may be used to tow hybrid start/run apparatus and transport assembly 10 to or from a site at which it is used by means of an external towing device, e.g. tractor, truck, etc. Tongue 24 may also be used to manually move hybrid start/run apparatus and transport assembly 10 to or from a site at which it is used, as will be explained in more detail below.

Figure 2:
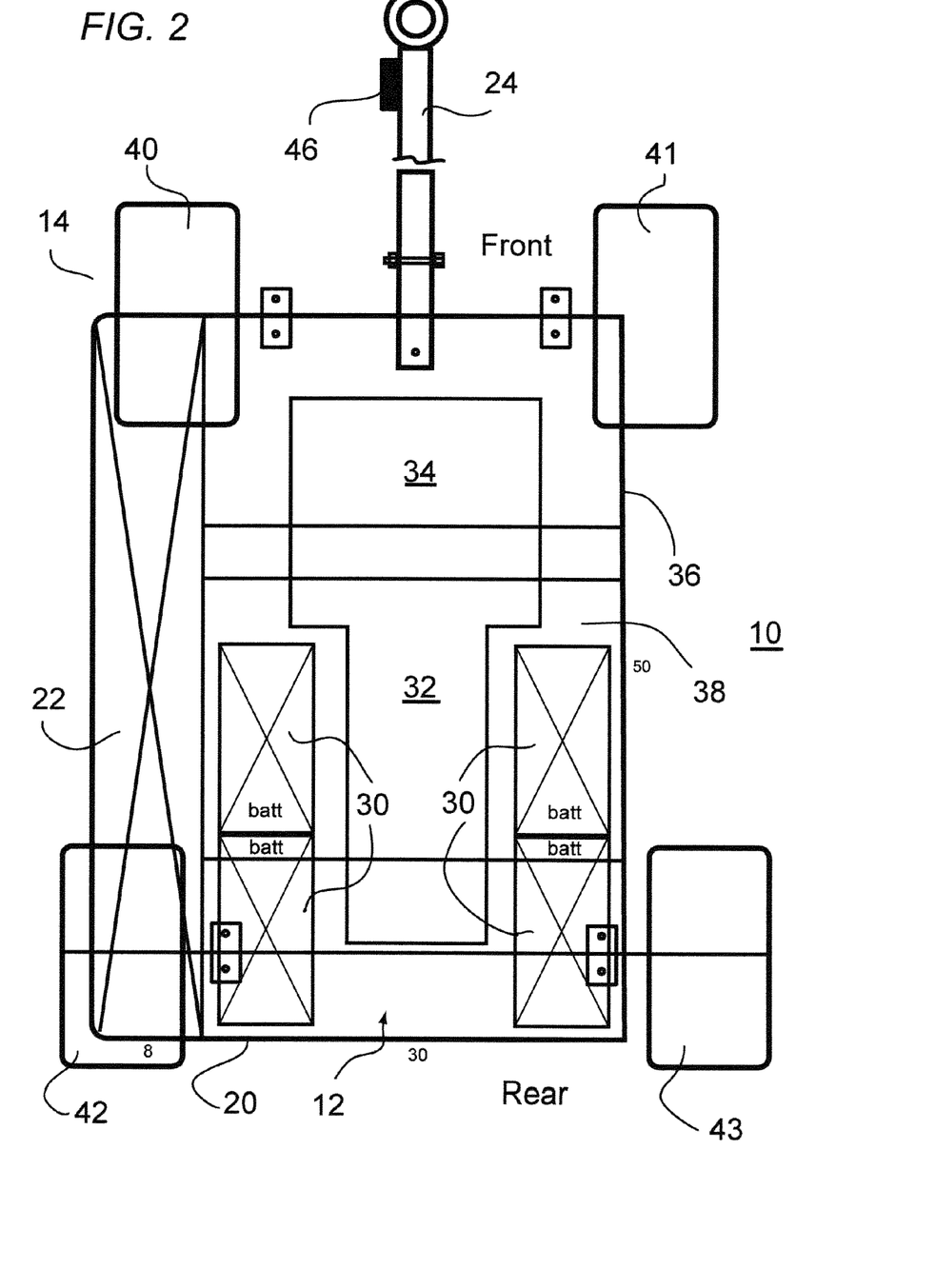
FIG. 2 is general layout, top view of the hybrid start/run and transport assembly of FIG. 1.

Referring additionally to FIG. 2, a general layout, top view, of hybrid start/run apparatus and transport assembly 10 is illustrated. Hybrid start/run apparatus 12 includes 140 ampere hour starting batteries, in this embodiment four batteries designated 30, a 430 ampere, 28 Volt DC generator 32, and an engine including one of a 21 horsepower diesel engine or a 26 horsepower gasoline engine 34 for driving generator 32, as explained further below. It will be understood that the specific sizes and amounts described herein are for purposes of example and are not intended to be limiting. Truck 20 includes a heavy duty frame 36 formed of some convenient material, such as steel angle iron or the like, and a screen type bed 38, formed of some convenient material, such as steel mesh or the like. Truck 20 includes two front wheels 40 and 41 and two rear wheels 42 and 43. In this preferred embodiment, wheels 40-43 are automotive type roller bearing wheels with drum type brakes but it will be understood that other embodiments may be used in other applications. Tongue 24 is attached to front wheels 40 and 41 for steering and includes a movement control 46 for forward or reverse movements and for speed control.

Figure 3:
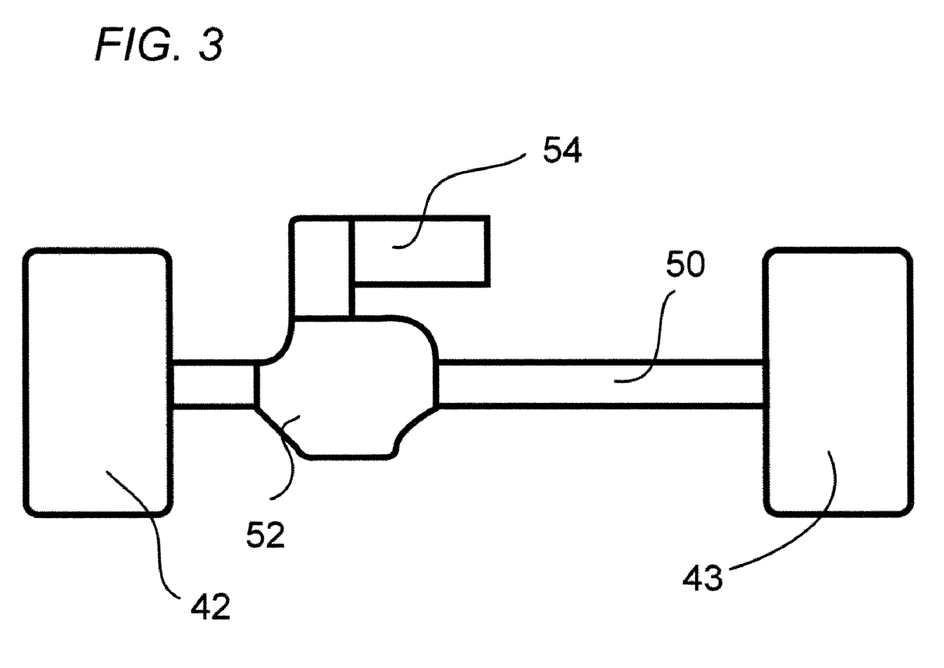
FIG. 3 is partial layout, top view of a portion of the hybrid start/run and transport assembly of FIG. 1.

Referring additionally to FIG. 3, it can be seen that rear wheels 42 and 43 are mounted on the ends of an axle 50 that includes a driving transmission 52. A 24 Volt DC drive motor 54 is attached to transmission 52 for driving rear wheels 42 and 43. As explained below, drive motor 54 is attached to a 24 Volt battery, designated 56 and illustrated in FIG. 5, included as a component of transport assembly 14. Battery 56 is attached to drive motor 54 for forward and reverse movements as well as having included therewith a speed control.

Figure 4:
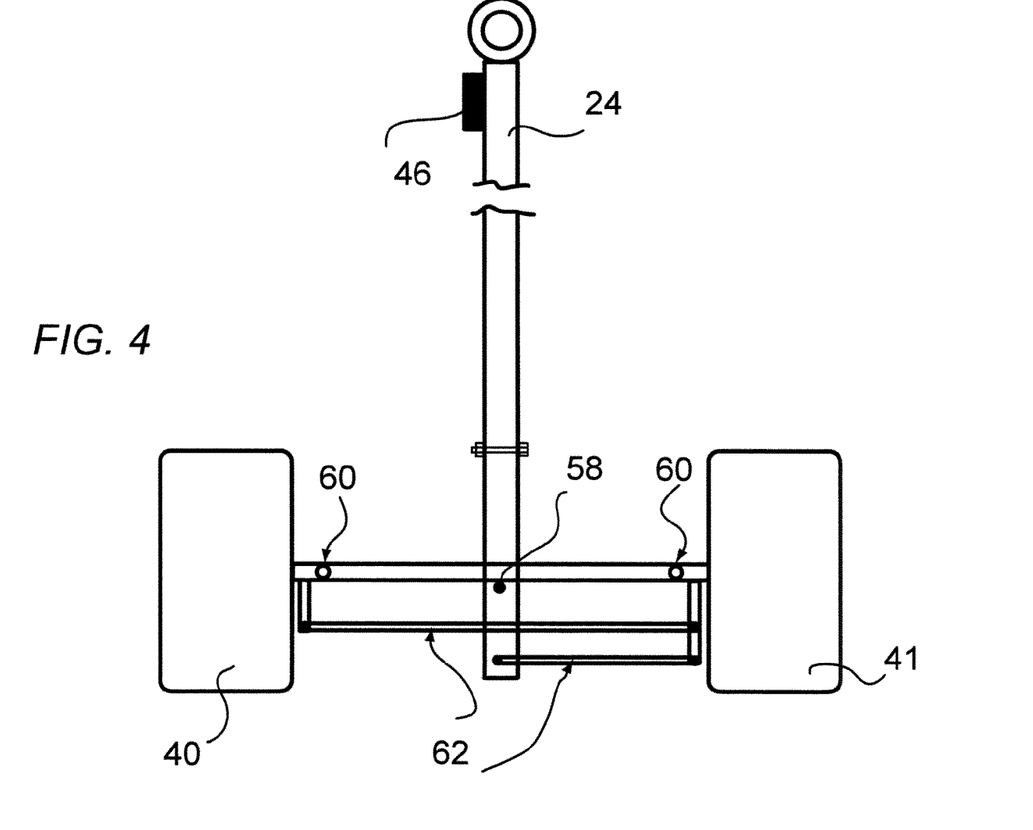
FIG. 4 is partial layout, top view of another portion of the hybrid start/run and transport assembly of FIG. 1.

Referring additionally to FIG. 4, a simplified semi-schematic view of steering and control apparatus is illustrated. Control tongue 24 is attached by a tongue bolt 58 adjacent the proximal end to mounting apparatus for front wheels 40 and 41. The mounting apparatus includes an axle and king pins 60 to allow pivoting of wheels 40 and 41 from the inline orientation in a clockwise or counter clockwise movement to provide turning. The proximal end of tongue 24 is attached by tie rods 62 to king pins 60 to pivot wheels 40 and 41 in a turning movement as tongue 24 is moved left or right. The distal end of tongue 24 is designed to be attached to a towing vehicle if desired.

Figure 5:
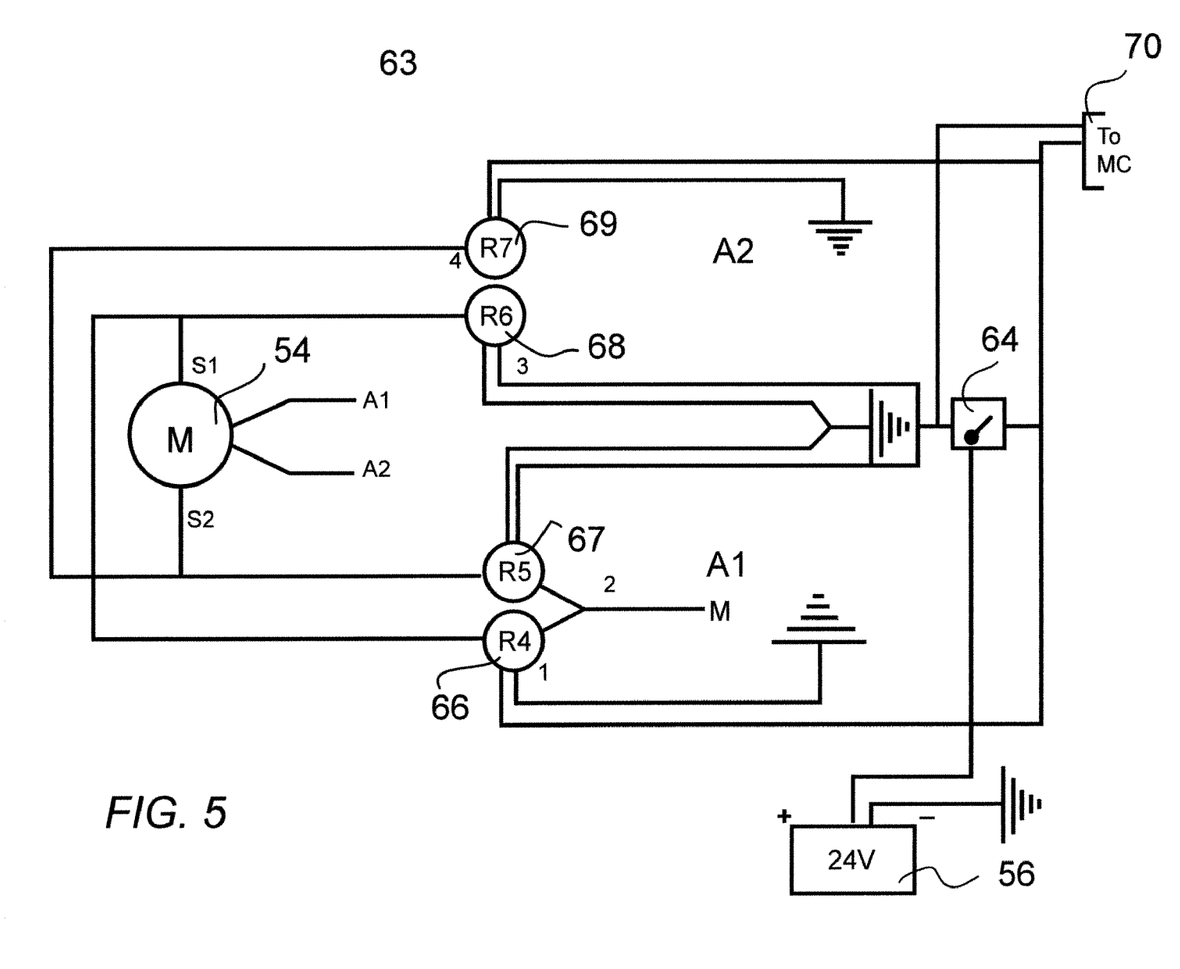
FIG. 5 is a schematic/block diagram of transport assembly control circuitry.

Referring to FIG. 5, a schematic representation of a motor control circuit 63 for drive motor 54 is illustrated. The negative terminal of battery 56 is connected to ground and the positive terminal is connected to a forward/reverse switch 64 that connects power to four relay switches 66 through 69 and to a speed control circuit 70 (illustrated in FIG. 6). Relay switches 66 through 69 control the direction of current applied to motor 54 (i.e. forward reverse movement), through the stator coil S1/S2 and the armature A1/A2, and the amount of current (i.e. speed) is controlled by circuit 70 in FIG. 6. Both forward/reverse switch 64 and speed control 70 are physically located on movement control 46 adjacent the distal end of tongue 24 for convenience in manually operating transport assembly 14.

Figure 6:
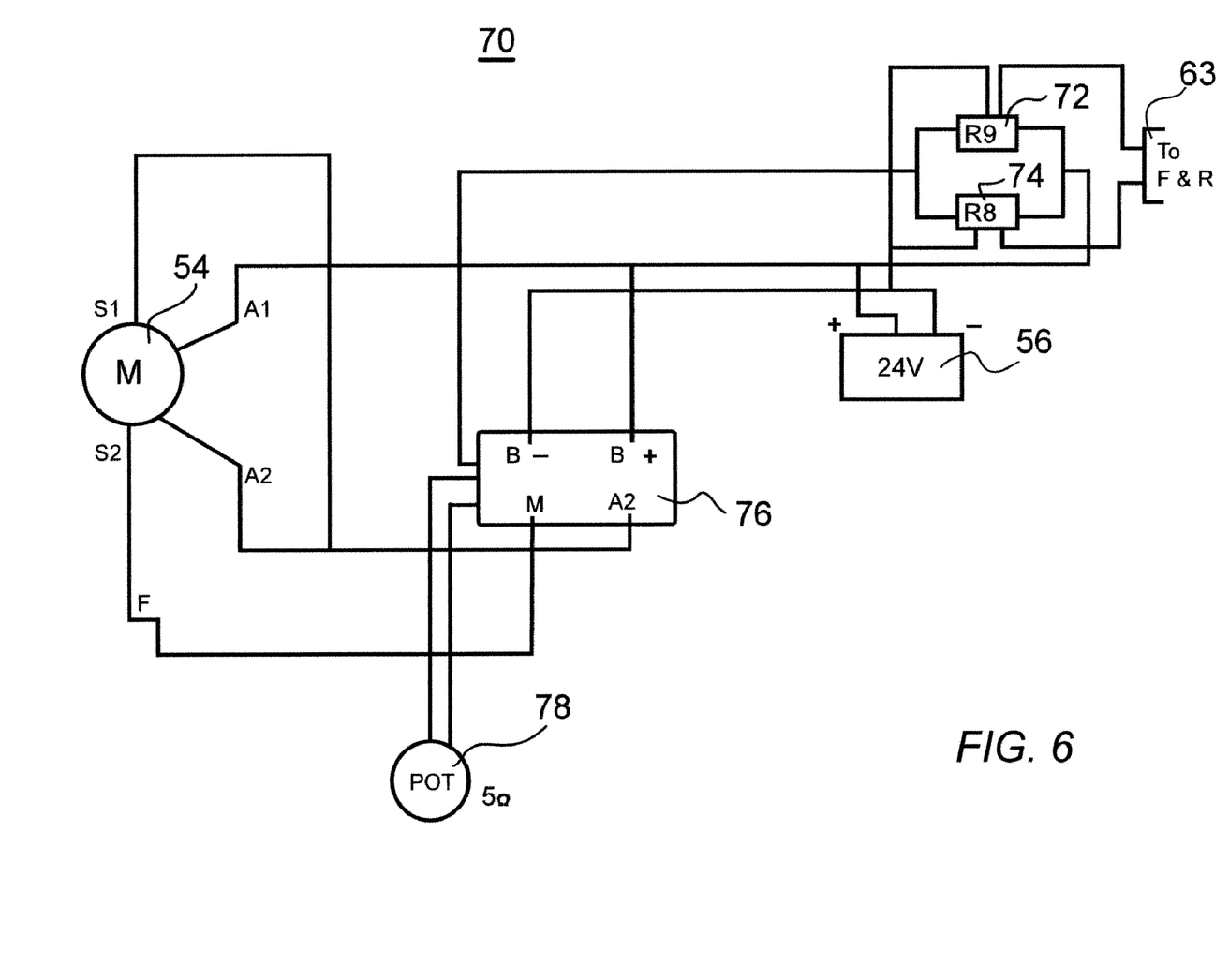
FIG. 6 is a schematic/block diagram of motor control circuitry.

Referring additionally to FIG. 6, a circuit diagram of speed control 70 is illustrated. Motor control circuit 63 is connected by a pair of leads to a pair of relay switches 72 and 74. Inputs of relay switches 72 and 74 are connected to battery 56, to the stator S1/S2 and armature A1/A2 windings of motor 54, and to a current control device 76, including a potentiometer 78 coupled thereto. Speed control 70 is manually controllable to provide a selected amount of current flowing in the windings of motor 54 to determine the speed of transport assembly 14 during manual operation. While specific motors, batteries, and other components have been shown in this preferred embodiment to provide manual control for the direction and speed of transport assembly 14, it will be understood that other components and circuitry could be utilized in various specific applications.

Here it should be understood that several options are available for starting a remotely located engine, depending upon the engine, the prevailing conditions, etc. For example, engine 34 can be started to drive generator 32 and power (current) from both generator 32 and batteries 30 can be used for starting a remotely located engine. Generally, batteries 30 alone will be used for starting the remotely located engine, since batteries 30 by themselves provide sufficient current for staring a remotely located engine. However, in the starting and operation or run of aircraft, for example, hybrid start/run apparatus 12 is generally connected to the electrical system of the aircraft and once the engine or engines start, apparatus 12 may continue to supply power to the electrical system for a period of time (e.g. engine warm-up, etc.). While batteries 30 can generally supply sufficient power to start the engines, they may not be able to support continuous operation thereafter. Thus, for such operations, engine 34 is started to drive generator 32 and both batteries 30 and generator 32 are used to provide power for starting and continuous run. It should also be noted that if engine 34 is the 21 horsepower diesel engine, it is generally constructed to run at a continuous speed once activated. If engine 34 is the 26 horsepower gasoline engine it is generally started prior to the operation and may be accelerated or decelerated during the operation to provide the desired amount of electrical power. Also, in this disclosure, cables are used that are adapted to be coupled to a remotely located engine, which in the case of aircraft is preferably coupled through the electrical system.

Figure 7:
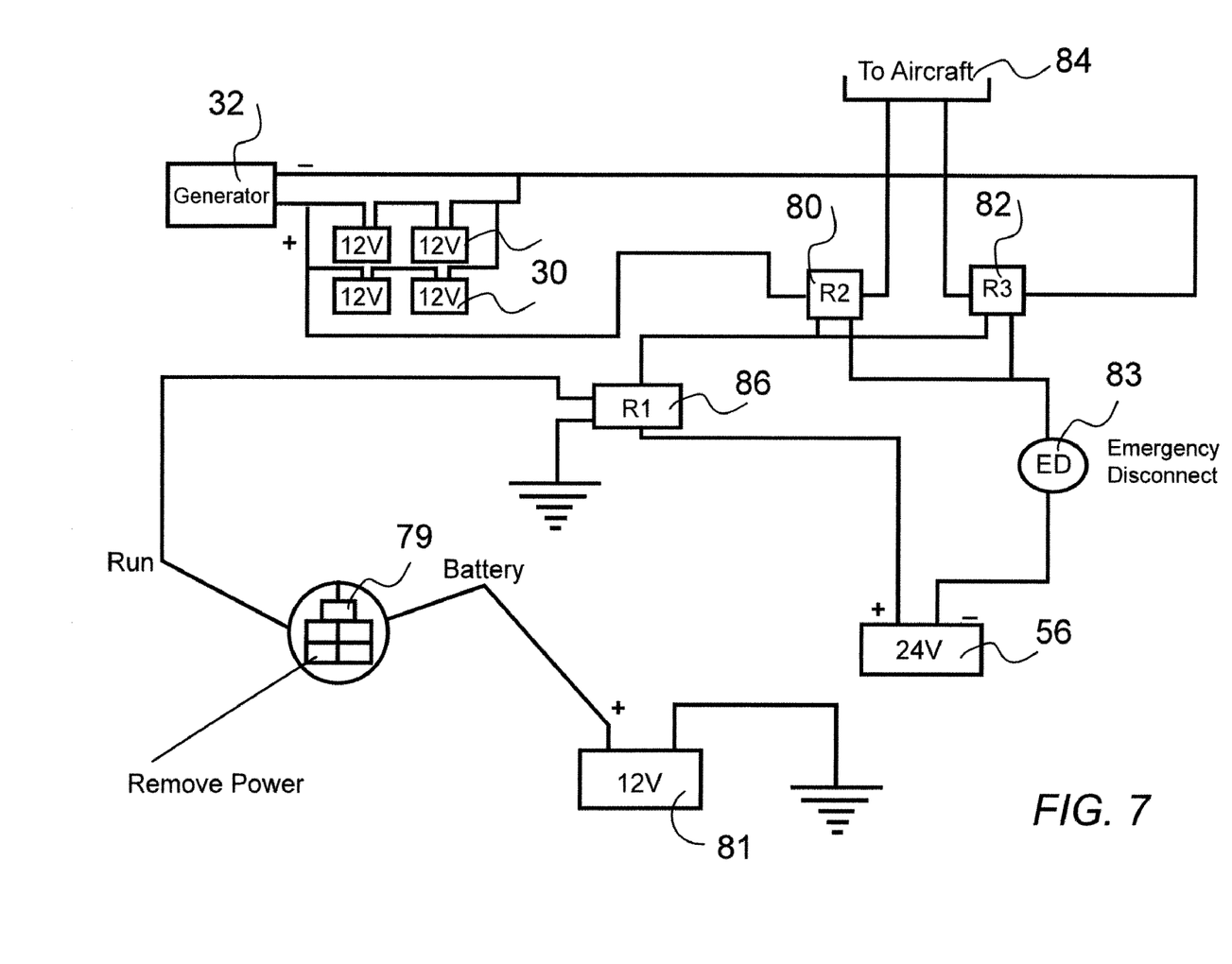
FIG. 7 is a schematic/block diagram of hybrid start/run control circuitry.

Turning to FIG. 7, a schematic diagram of electrical circuitry designed to couple generator 32 and/or batteries 30 to an aircraft under various conditions is illustrated. In this embodiment a control 79 is illustrated for placing hybrid start/run assembly 12 in the 'start/run' or 'remove power' functions. It should be understood that controller 79 is illustrated to simplify the explanation and could be eliminated with the functions simply incorporated into the operation, as will be understood from the description below. In the circuit, generator 32 is connected in parallel with two pairs of batteries 30 so that 24 volts from batteries 30 and/or generator 32 are applied through relay switches 80 and 82 to, for example, the electrical system 84 of an aircraft when relay switches 80 and 82 are energized. The positive terminal of a battery 56 is connected to energize relay switches 80 and 82 through another relay switch 86, which is energized by a 12 Volt battery 81 when control 79 is in the start/run position. In the start/run position only batteries 30 supply power to aircraft 84 when engine 34 is not running and generator 32 is inoperative. When engine 34 is activated generator 32 is driven to supply power along with batteries 30 to aircraft 84. Other than during starting operations, engine 34 and generator 32 may be used to maintain batteries 30 in a fully charged state.

An emergency disconnect device 83 is connected in the negative line between relay switches 80 and 82 and the 24 volt battery 56 to automatically remove power from relay switches 80 and 82 and, therefore, aircraft 84 in the event of some accident or other problem. Emergency disconnect device 83 could be, for example, an easily accessible manually operated push-button or the like. Power can also be removed from relay switches 80 and 82 and, therefore, aircraft 84 by simply moving manual control 79 to the 'remove power' position. Generally, if both the 'remove power' position of control 79 and emergency disconnect device 83 are included, control 79 is used to remove power when an operation is completed and emergency disconnect device 83 is used to remove power in an emergency. However, it will be understood that while both switches may not be included, they are illustrated to exemplify different potential functions. Any switch or switches utilized to control the application of power (current) to a remotely located engine (e.g. an aircraft, etc.) is referred to herein generically as switching apparatus. While specific switches, batteries, and other components have been shown in this preferred embodiment to provide manual control for the application of electrical power to an aircraft or the like, it will be understood that other components and circuitry could be utilized in various specific applications.

Thus, hybrid circuitry and devices have been disclosed in which an electric generator and/or batteries can be used to provide starting power and run power for some period of time after starting. In this specific embodiment, the batteries are capable of providing 3400 peak amperes of starting power and the generator is capable of supplying 300 peak amperes of continuous power after starting. To power a generator of this size, an engine of less than 30 horsepower is sufficient. It will be understood by those skilled in the art that the peak ampere designations actually dictate and define the size of the components. For example, a generator that provides 300 peak amperes is less than a tenth of the size of a generator used for providing starting current, i.e. that must be capable of supplying 3400 peak amperes. Because the hybrid circuitry incorporates batteries to provide the high starting power and a generator to provide the continuous run power as well as a means to immediately recharge the batteries, the entire hybrid start/run apparatus is relatively small, compact and inexpensive. The hybrid start/run assembly 12 is conveniently carried by a transport assembly 14 that can be towed by any convenient vehicle or can be very conveniently operated manually with very little effort and loss of time.

Various changes and modifications to the embodiment herein chosen for purposes of illustration will readily occur to those skilled in the art. To the extent that such modifications and variations do not depart from the spirit of the invention, they are intended to be included within the scope of the invention which is assessed only by a fair interpretation of the following claims.

Having fully described the invention in such clear and concise terms as to enable those skilled in the art to understand and practice the same, the invention claimed is:

1. Hybrid start/run apparatus for engines comprising:
    a transport assembly including a multi-wheeled truck with at least a front wheel and two rear wheels, a drive motor attached to the rear wheels, a transport control apparatus connected to the drive motor and including forward, reverse, and speed controls, and steering apparatus coupled to the at least one front wheel; and
    a hybrid start/run assembly including an engine, a mating generator coupled to be driven by the engine and a plurality of batteries mounted on the transport assembly, the batteries and generator being coupled in parallel to cables adapted to be coupled to a remotely located engine, the batteries being capable of supplying starting electrical power to the remotely located engine and the generator being capable of supplying run electrical power.

2. Hybrid start/run apparatus for engines as claimed in claim 1 wherein the remotely located engine further includes an aircraft having an electrical system and the cables adapted to be coupled to the remotely located engine are designed to be connected to the electrical system, the batteries being capable of supplying starting electrical power to the aircraft engine through the electrical system and the generator being capable of supplying run electrical power to the electrical system.

3. Hybrid start/run apparatus for engines as claimed in claim 1 wherein the plurality of batteries are capable of supplying approximately 3400 peak amperes of starting current.

4. Hybrid start/run apparatus for engines as claimed in claim 1 wherein the generator is capable of supplying approximately 300 peak amperes of run current.

5. Hybrid start/run apparatus for engines comprising:
    a transport assembly including a multi-wheeled truck with at least a front wheel and two rear wheels, a drive motor attached to the rear wheels, transport control apparatus connected to the drive motor and including forward, reverse, and speed controls, and steering apparatus coupled to the at least one front wheel; and
    a hybrid start/run assembly including a plurality of batteries and an engine with a mating generator coupled to be driven by the engine, the batteries, engine and generator being mounted on the transport assembly, switching apparatus and cables adapted to be coupled to a remotely located engine and the batteries and generator being coupled in parallel to the cables by the switching apparatus, the batteries being capable of supplying starting electrical power to the remotely located engine and the generator being capable of supplying run electrical power.

6. Hybrid start/run apparatus for engines as claimed in claim 5 wherein the multi-wheeled truck includes two front wheel and two rear wheels and the steering apparatus includes a tongue attached to the front wheels and constructed to be used for one of towing and manually moving the multi-wheeled truck.

7. Hybrid start/run apparatus for engines as claimed in claim 6 wherein the tongue includes the transport control apparatus mounted thereon.

8. Hybrid start/run apparatus for engines as claimed in claim 7 further including a drive motor battery coupled to the drive motor through the transport control apparatus, the forward, reverse and, speed controls of the transport control apparatus coupling the drive motor battery to the drive motor in different orientations.

9. Hybrid start/run apparatus for engines as claimed in claim 5 wherein the multi-wheeled truck includes a heavy duty frame and a screen type bed and the hybrid start/run assembly has bottom venting through the screen type bed.

10. Hybrid start/run apparatus for engines as claimed in claim 5 wherein the switching apparatus includes a start/run position and a remove power position.

11. Hybrid start/run apparatus for engines as claimed in claim 5 wherein the plurality of batteries are capable of supplying approximately 3400 peak amperes of starting current.

12. Hybrid start/run apparatus for engines as claimed in claim 5 wherein the generator is capable of supplying approximately 300 peak amperes of run current.

13. Hybrid start/run apparatus for engines as claimed in claim 5 wherein the engine and the mating generator are activated and the generator and the plurality of batteries are coupled in parallel to recharge the plurality of batteries after each use.

* * * * *